US006959240B2

(12) United States Patent
Okamoto

(10) Patent No.: US 6,959,240 B2
(45) Date of Patent: Oct. 25, 2005

(54) CORRECTION DEVICE FOR CORRECTING ACCELERATION DATA, METHOD THEREFOR, PROGRAM THEREFOR, RECORDING MEDIUM CONTAINING THE PROGRAM AND NAVIGATION GUIDE DEVICE

(75) Inventor: Tatsuya Okamoto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/412,413

(22) Filed: Apr. 14, 2003

(65) Prior Publication Data

US 2004/0064234 A1 Apr. 1, 2004

(30) Foreign Application Priority Data

Apr. 15, 2002 (JP) ............................ 2002-111894

(51) Int. Cl.[7] ............................ G06F 7/70; G06G 7/76
(52) U.S. Cl. ........................................ 701/70; 702/141
(58) Field of Search ............................... 701/701, 207, 701/213–214, 216–217, 220–221, 70, 75, 701/79, 80, 1; 702/85, 94, 96, 104, 141–142, 702/150, 154; 342/357.01, 357.02, 357.05, 342/357.06, 357.14; 73/105, 178 R, 179; 33/1 N, 521

(56) References Cited

U.S. PATENT DOCUMENTS

| | | | |
|---|---|---|---|
| 5,828,987 A * | 10/1998 | Tano et al. | 702/150 |
| 5,856,802 A * | 1/1999 | Ura et al. | 342/357.08 |
| 6,029,111 A | 2/2000 | Croyle | 701/207 |
| 6,115,668 A * | 9/2000 | Kaneko et al. | 701/207 |
| 6,205,401 B1 * | 3/2001 | Pickhard et al. | 701/220 |
| 6,292,750 B1 | 9/2001 | Lin | 701/214 |
| 6,308,134 B1 * | 10/2001 | Croyle et al. | 701/220 |
| 6,532,419 B1 * | 3/2003 | Begin et al. | 701/220 |
| 2003/0191582 A1 * | 10/2003 | Terada | 701/207 |

FOREIGN PATENT DOCUMENTS

| | | |
|---|---|---|
| EP | 0488594 A1 | 6/1992 |
| JP | 09-096533 | 4/1997 |

OTHER PUBLICATIONS

European Search Report dated Jun. 8, 2004.

* cited by examiner

*Primary Examiner*—Jacques H. Louis-Jacques
(74) *Attorney, Agent, or Firm*—Armstrong, Kratz, Quintos, Hanson & Brooks, LLP

(57) ABSTRACT

A correction device determines, by calculation, a real acceleration based on output from a velocity sensor 4. GPS mediated signal receiving portion 2 receives radio navigation waves from plural GPS satellites. The device detects a frequency change of the radio waves evoked as a result of Doppler effect, acquires horizontal and vertical velocity components based on the frequency change, and determines, by calculation, a gradient angle. Then, the device determines, by calculation, the gravitational acceleration sine of the gradient angle (G. sin θ). The device adds the real acceleration and the gravitational acceleration sine of the gradient angle (G. sin θ) to provide a theoretical acceleration of the acceleration sensor. The device divides the theoretical acceleration of the acceleration sensor with the sensitivity of the acceleration sensor 6, and subtracts the result from output from the acceleration sensor 6, to provide a right offset value. Then, the sequentially obtained offset values are averaged to give an updated offset value. This process makes it possible to readily obtain a right offset value even during the driving of the mobile body.

7 Claims, 3 Drawing Sheets

CORRECTION DEVICE FOR CORRECTING ACCELERATION DATA, METHOD THEREFOR, PROGRAM THEREFOR, RECORDING MEDIUM CONTAINING THE PROGRAM AND NAVIGATION GUIDE DEVICE

BACKGROUND OF THE INVENTION

1. Field of the Invention

The present invention relates to a correction device for correcting acceleration data provided based on output from an acceleration sensor which detects the acceleration of a mobile body, by determining via calculation an offset value of the acceleration sensor and correcting the output based on the offset value, correction method therefor, correction program therefor, recording medium for recording the program, and navigation guide device.

2. Description of Related Art

The conventional well-known system for guiding the navigation of a mobile body such as a motor vehicle, aircraft and ship includes navigation guide systems. The navigation guide system obtains information regarding the current position of a mobile body, relates the current position with map information, and plots the current position on a map. Specifically, the navigation guide system determines the current position of a mobile body, its travel distance and its heading based on a radio signal received from an artificial satellite, and on signals provided by various sensors attached to the mobile body, and informs the mobile body of its driving condition by displaying the acquired data on a map.

A simple conventional navigation guide system uses an acceleration sensor for obtaining information regarding the driving condition of a mobile body. The acceleration sensor is configured such that its output changes in accordance with the change of the acceleration of the mobile body. The system in question checks whether there is any output from the acceleration sensor when the mobile body remains motionless, As described above, with the conventional navigation guide system, to obtain an offset value of an acceleration sensor, it is necessary to keep a mobile body to which the sensor is attached motionless on a horizontal plane and to read output from the sensor, which requires complicated operation. Moreover, the acceleration sensor may undergo variations as a result of temperature change during the prolonged use of a mobile body to which the sensor is attached, as described above. Thus, to ensure the rightness of the acceleration data acquired based on output from the acceleration sensor, it is necessary to often check the sensor and obtain a right offset value during the prolonged use of the mobile body, which requires complicated operation. Such an operation when performed often may hinder the proper operation of the mobile body. Moreover, if owing to a certain situation, checking of the sensor were impossible, the sensor would be left unchecked, and the navigation guide system could not achieve the proper navigation guide assigned to it.

SUMMARY OF THE INVENTION

In a view of above, a principal object of this invention is to provide a correction device for correction an acceleration sensor by readily determining an offset value of the sensor and correction output from the sensor based on the offset value, correction method therefor, correction program therefor, recording medium for recording the program, and navigation guide device.

The correction device of this invention for correction acceleration data, correction being achieved by determining, via calculation, an offset value of an acceleration sensor which detects the acceleration of a mobile body and delivers the detection result as output, and by correcting acceleration data determined based on output from the acceleration sensor using the offset value, comprises real acceleration calculating section for determining, by calculation, a real acceleration of the mobile body bass ed on a signal changing in association with the moving velocity of the mobile body; velocity data acquiring section for acquiring horizontal and vertical velocity components by receiving radio waves from plural artificial satellites, and using a frequency change of received waves evoked as a result of Doppler effect; gradient angle calculating section for calculating a gradient angle between a horizontal plane passing through the mobile body and a plane towards which the mobile body is moving, based on the horizontal and vertical velocity components acquired by the velocity data acquiring section; gravitational acceleration sine of gradient angle calculating section for determining, by calculation, a gravitational acceleration sine of the gradient angle determined by the gradient angle calculating section; reference value calculating section for determining, by calculation, reference acceleration data based on the real acceleration provided by the real acceleration calculating section and on the gravitational acceleration sine of the gradient angle provided by the gravitational acceleration sine of the gradient angle calculating section; and correcting section for correcting the offset based on the reference acceleration data provided by the reference value calculating section.

According to this invention, the real acceleration calculating section determines, by calculation, a real acceleration of a mobile body based on a signal changing in correspondence with the change of the velocity of the mobile body. The velocity data acquiring section acquires horizontal and vertical velocity components based on changes of the frequencies of RF (radio frequency) waves received from plural artificial satellites, occurring as a result of Doppler effect. The gradient angle calculating section determines, by calculation, a gradient angle between a horizontal plane passing through the mobile body and a plane towards which the mobile body is moving, based on the velocity data. The gravitational acceleration sine of gradient angle calculating section determines, by calculation, a gravitational acceleration sine of the gradient angle. The reference value calculating section determines, by calculation, reference acceleration data based on the real acceleration and the gravitational acceleration sine of the gradient angle. The correcting section corrects the offset value based on the reference acceleration data. Thanks to the procedures, it is possible to correct the offset value of the acceleration sensor even during the driving of the mobile body, and thus to easily obtain right acceleration data based on output from the acceleration sensor.

According to the correction device of this invention for correcting acceleration data, preferably the correcting section divides plural reference acceleration data obtained during the driving of the mobile body with the sensitivity of the acceleration sensor, and subtracts the result from output from the sensor, so that the plural offset values are averaged. This procedure simplifies the operation necessary for obtaining a right offset value during the driving of the mobile body without requiring complicated procedures for the operation.

According to the correction device of this invention for correcting acceleration data, preferably the correcting section, on detection of a driving condition where the real acceleration determined by the real acceleration calculating section is nearly zero, and the gradient angle determined by the gradient angle calculating section is nearly zero degree, takes up output from the acceleration, and adopts it as an approximately right offset value.

According to this invention, when the driving condition consists of driving the mobile body at a constant velocity on a horizontal plane with a real acceleration and gradient angle being kept nearly zero and zero angle, respectively, the mobile body can be regarded as resting motionless on a horizontal plane, as far as the calculation of an offset value is concerned. Thus, in such a driving condition, it is possible to easily obtain an approximately right offset value without requiring complicated calculations.

The correction method of this invention for correcting acceleration data, using the correction device for correcting the acceleration data, correction being achieved by causing a computation section to calculate an offset value of an acceleration sensor which detects the change of velocity of a mobile body and delivers it as output, and to correct acceleration data provided by the acceleration sensor based on the offset value, comprises the steps of: detecting a signal changing in accordance with the moving velocity of the mobile body; determining, by calculation, a real acceleration of the mobile body based on the detected signal; acquiring horizontal and vertical velocity components by receiving radio waves from plural artificial satellites, and using a frequency change of received radio waves evoked as a result of Doppler effect; determining, by calculation, a gradient angle between a horizontal plane passing through the mobile body and a plane towards which the mobile body is moving, based on the horizontal and vertical velocity components; determining, by calculation, the gravitational acceleration sine of the gradient angle; determining, by calculation, a reference velocity data by adding the real acceleration of the mobile body and the gravitational acceleration sine of the gradient angle; and correcting the acceleration data by correcting the offset value based on the reference acceleration data.

The velocity data correction program of this invention is a program for instructing a computation section to effect the navigation guide method of this invention.

If the acceleration data correction program of this invention is installed in a computation section such as a general purpose computer, it will be possible for the acceleration data correction method to be put into practice via the computer, which will greatly expand the applicability of this invention.

The recording medium of this invention is a medium for recording an acceleration data correction program of this invention in a form legible to a computation section.

According to this invention, because an acceleration data correction program of this invention is recorded in a recording medium, the handling of acceleration data correction program will become easy which will greatly widen the applicability of this invention.

The computation section used in combination with the acceleration data correction program and recording medium of this invention includes, for example, not only a personal computer but also plural computers organized into a network, an IC or CPU element installed in a microcomputer, a circuit board carrying multiple electronic components, etc.

The navigation guide system of this invention comprises the correction device of this invention for correcting acceleration data and a navigation guide device which acquires acceleration data corrected by the correction device, and guides the navigation of a mobile body by providing the mobile body with information regarding the moving state of the mobile body in accordance with its current driving performance together with map information.

According to this invention, the navigation guide system acquires acceleration data corrected by the acceleration data correcting device, and guides the navigation of a mobile body by providing the mobile body with information regarding the moving state of the mobile body in accordance with the current driving performance of the mobile body together with map information. Because of this, it is possible to correct an offset value of the acceleration sensor, to readily obtain properly corrected acceleration data, and to accurately guide the navigation of the mobile body all through the driving.

DETAILED DESCRIPTION OF THE PREFERRED EMBODIMENT(S)

An embodiment of the present invention will be described below with reference to the drawings.

[Organization of Navigation Guide System]

Figure 1:
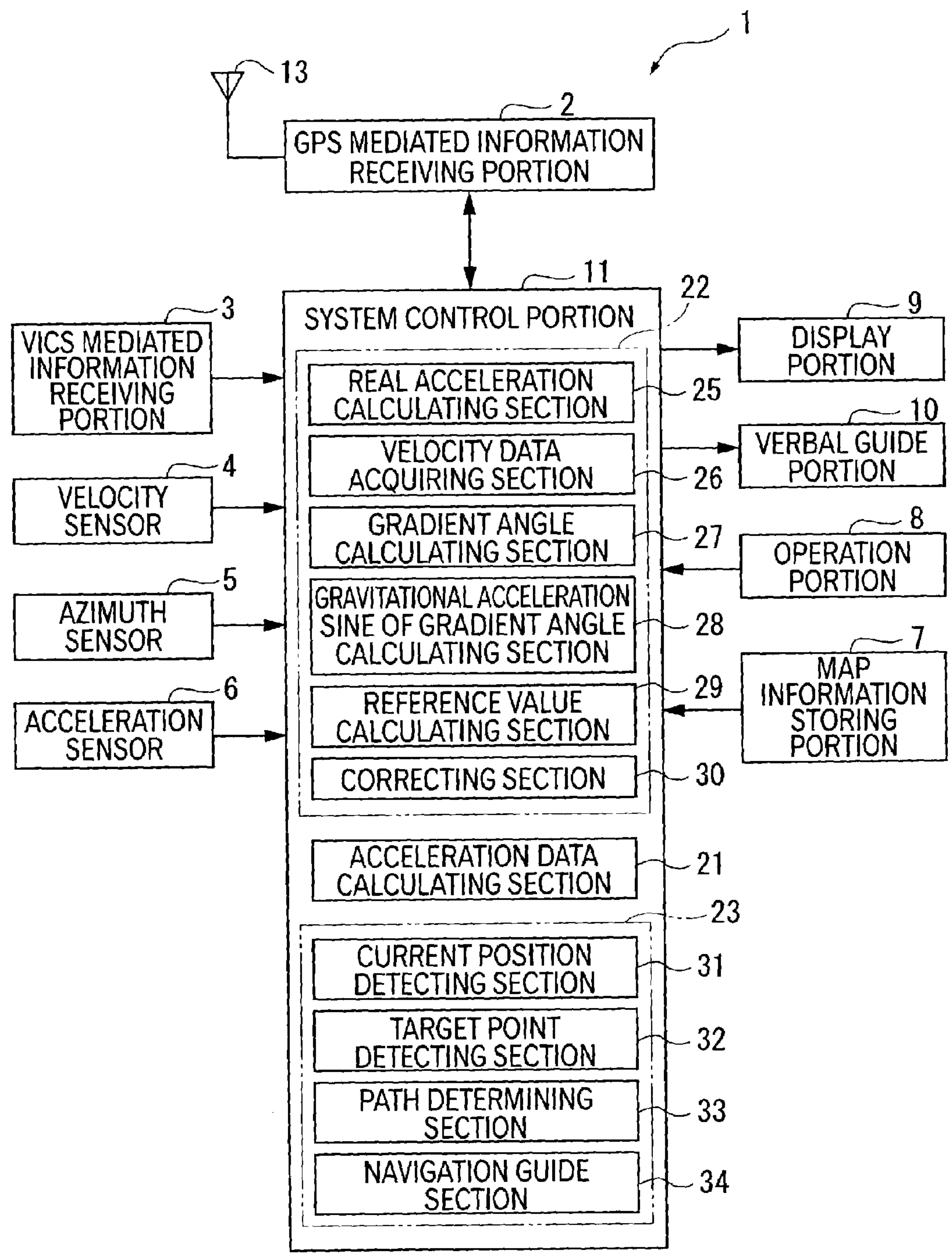
FIG. 1 is a block diagram for illustrating the simplified organization of a navigation guide system representing an embodiment of this invention.

FIG. 1 is a block diagram for illustrating the simplified organization of a navigation guide device embodying this invention. In FIG. 1, 1 represents the navigation guide device. The navigation guide device 1 is installed in a vehicle not illustrated here such as an automobile. The device in question operates via electric power supplied by a battery installed in the vehicle.

The navigation guide device 1 comprises a GPS (Global Positioning System) mediated information receiving portion 2, VICS (Vehicle Information and Communication System) mediated information receiving portion 3, velocity sensor 4, azimuth sensor 5, acceleration sensor 6, map information storing portion 7 serving as a map information acquiring section, operation portion 8, display portion 9, verbal guide portion 10, and system control portion 11.

The GPS mediated information receiving portion 2 has a GPS antenna 13. The GPS mediated information receiving portion 2 receives via the GPS antenna 13 an RF wave carrying navigation guide information transmitted by a GPS satellite or an artificial satellite not illustrated here. The GPS mediated information receiving portion 2 determines, by calculation, a current position of the vehicle on a miniature coordinate system based on a signal received, and delivers the data or GPS data to the system control portion 11.

The VICS mediated information receiving portion 3 has a VICS antenna not illustrated here, and collects via the antenna information regarding traffics ahead. Specifically, the portion in question receives an optical signal or FM multiplexed wave broadcast from a VICS not illustrated here, and obtains information about traffic jams, accidents, road constructions and traffic regulations which will be encountered along a path to be taken by the vehicle. The information thus acquired about traffics ahead the current position is delivered to the system control portion 11.

The velocity sensor 4 is installed in the vehicle, and determines the moment-to-moment velocity of the vehicle based on a signal changing in correspondence with the current velocity of the vehicle. The velocity sensor 4, for example, counts or reads pulse signals or voltage delivered or accumulated with the rotation of a wheel or wheel axis. The velocity sensor 4 delivers the pulse count or voltage measurement thus acquired to the system control portion 11.

The azimuth sensor 5 is installed in the vehicle, has a so-called gyrosensor, and detects the heading of the vehicle, that is, the bearing toward which the vehicle is moving. The azimuth sensor 5 transforms the vehicle's heading detected, for example, into heading data such as a pulse count or voltage measurement, and delivers the data to the system control portion 11.

The acceleration sensor 6 is installed in the vehicle, and detects the acceleration of the vehicle in the direction of its heading. The acceleration sensor 6 converts the acceleration thus detected into output such as a pulse count or voltage measurement, and delivers the output to the system control portion 11.

The map information storing portion 7 serving as a map information acquiring section stores information necessary for guiding the navigation of a vehicle such as road maps, and additional information as will be described later, in a readily readable form. For example, the map information storing portion 7 has a drive unit for reading map information recorded in an optical disk such as DVD-ROM (Digital Versatile Disk-Read Only Memory), or in a magnetic disk such as a hard disk. The portion in question delivers as appropriate the map information and additional information thus acquired to the system control portion 11. The map information acquiring section may include, instead of the map information storing portion 7, a separate wireless communication section such as a mobile phone or PHS (Personal Handyphone System) capable of receiving map information and additional information from a base station via a wireless medium, and providing the information as needed to the system control portion 11.

The operation portion 8 includes various operation buttons not illustrated here by which the user can instruct the navigation guide device 1 to display, for example, the current moving state of the vehicle, that is, one parameter representative of its driving condition. When the user presses an operation button, the operation portion 8 delivers an appropriate signal according to the button depressed to the system control portion 11, and causes the navigation guide device 1 to perform an operation determined by the depressed button, for example, display of operation state of the navigation guide device 1 or setting of a target point. The operation portion 8 allows the user to feed input. Input feeding may occur in any known manner, for example, via a touch panel placed on the display portion 9 or verbal input instead of via operation buttons as described above.

The display portion 9 displays image data including map information and additional information transmitted by the map information storing portion 7, as well as TV image data received by a TV receiver unit not illustrated here or image data read out via a driving unit from a recording medium such as an optical or magnetic disk. The display portion 9 may be based, for example, on a liquid crystal display (LCD), organic electroluminescence (EL), plasma display panel (PDP), or cathode ray tube (CRT).

The verbal guide portion 10 may include, for example, sound reproducing section such as a speaker not illustrated here. The verbal guide portion 10 provides the driver and passengers by voice with information necessary for secure driving such as the driving direction and driving condition of the vehicle. The voice reproducing section can also deliver as needed TV voice data received by a TV receiving unit or audio data read out from a recording medium such as an optical or magnetic disk. The verbal guide portion 10 does not need to have its own sound reproducing section but may use a speaker installed in the vehicle as the sound reproducing section.

The system control portion 11 has various ports for input and output not illustrated here. The input port may include, for example, a GPS mediated information receiving port connected to the GPS mediated information receiving portion 2, VICS signal receiving port connected to the VICS mediated information receiving portion 3, sensor ports connected to sensors 4, 5 and 6, keyboard input port connected to the operation portion 8, display control port connected to the display portion 9, and verbal input control port connected to the verbal guide portion 10. The system control portion 11 also includes an internal memory not illustrated here. The internal memory stores various programs operable on the platform of an OS (Operating System) which governs the overall operation of the navigation guide device 1. The system control portion 11 includes, among such various programs, velocity data calculating section 21, velocity data correcting section 22 serving as a device for correcting velocity data, and navigation guide section 23 serving as a device for guiding the navigation of the vehicle.

Acceleration data calculation section 21 determines, by calculation, the acceleration of the acceleration sensor 6 based on output from the acceleration sensor 6. The acceleration of the acceleration sensor is determined by seeking the difference between the sensor output and the offset value, and by multiplying the difference with the sensitivity of the acceleration sensor 6. This is expressed by the following equation:

$$\text{Acceleration of acceleration sensor}=(\text{output of ac. sensor}-\text{offset value of ac. sensor})\times\text{sensitivity of ac. sensor} \quad (1)$$

The offset value and the sensitivity of the acceleration sensor 6 are stored in an internal memory and fetched from the memory when it is required to calculate the acceleration of the acceleration sensor 6 by acceleration data calculation section 21.

Correction section 22 for correcting velocity data corrects the acceleration of the acceleration sensor determined by the acceleration data calculating section 21, or corrects the offset value required for determining the acceleration of the acceleration sensor. The acceleration data correcting section 22 comprises real acceleration calculating section 25, velocity information acquiring section 26, gradient angle calculating section 27, gravitational acceleration sine of gradient angle calculating section 28, reference value calculating section 29, and correcting section 30.

The real acceleration calculating section 25 determines, by calculation, the real acceleration of the vehicle based on the real acceleration data of the vehicle provided by the velocity sensor 4. For example, said section determines the real acceleration based on a train of pulses delivered by the velocity sensor 4 which represent the rotation of a wheel axis.

The velocity information acquiring section 26 calculates horizontal and vertical velocity components based on a frequency change in navigation radio waves occurring as a result of Doppler effect received via the GPS mediated information receiving portion 2. The velocity information acquiring section 26 checks how the GPS mediated signal receiving portion receives radio waves. For example, said section checks whether said portion successfully receives radio signals from plural artificial satellites simultaneously. Said section determines the signal reception state to be satisfactory when it finds that radio signals from multiple artificial satellites are received successfully.

Figure 2:
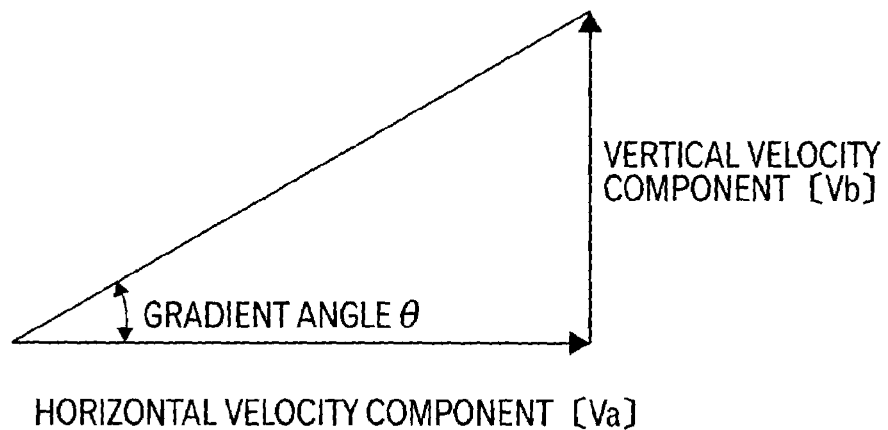
FIG. 2 illustrates how to calculate a gradient angle θ based on a horizontal velocity component and a vertical velocity component in an embodiment of this invention.

The gradient angle calculating section 27 determines, by calculation, the gradient angle of the current position of the vehicle based on the horizontal and vertical velocity components of the vehicle determined by the velocity information acquiring section 26. Namely, said section determines the gradient angle θ using the arctan (Vb/Va) as shown in FIG. 2.

Figure 3:
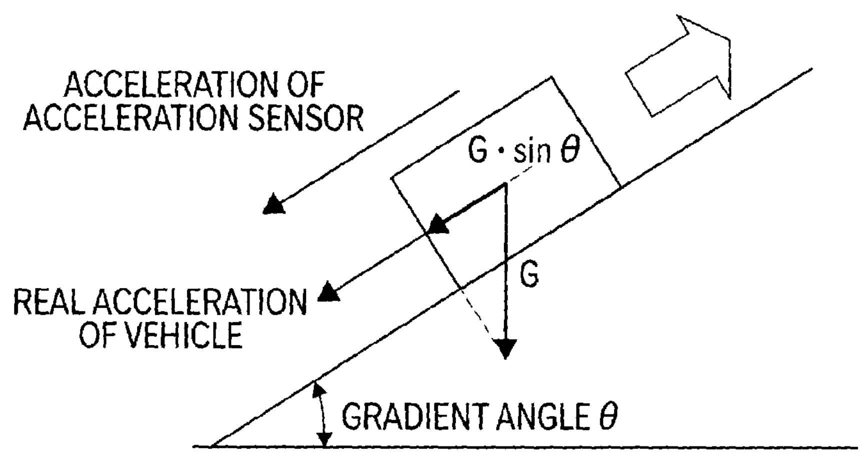
FIG. 3 illustrates how acceleration is determined by an acceleration sensor in the embodiment of this invention.

The gravitational acceleration sine of gradient angle calculating section 28 determines, by calculation, a sine of the gravitational acceleration with respect to the gradient angle θ obtained by the gradient angle calculating section 27. Namely, said section determines by calculation a sine value G. sin θ as shown in FIG. 3.

Figure 4:
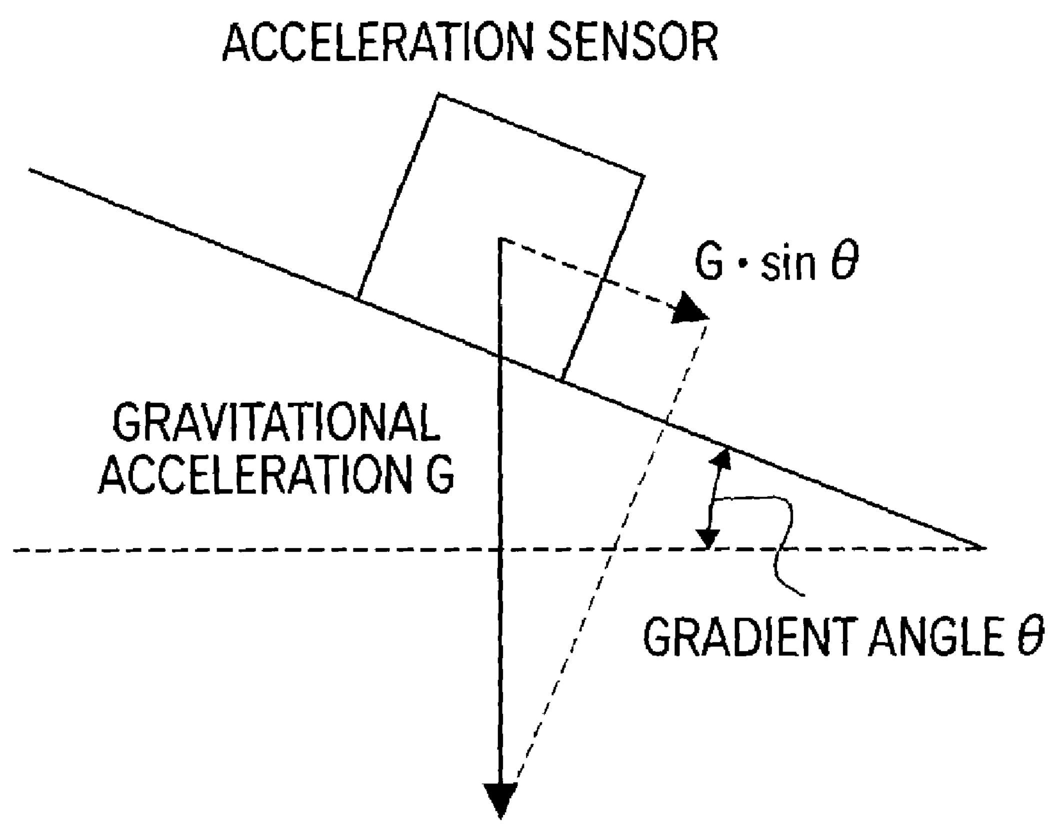
FIG. 4 illustrates, in said embodiment of this invention, how acceleration measurement with the acceleration sensor is affected when the vehicle to which the sensor is attached rests on a slope.

The reference value calculating section 29 generates, via calculation, reference acceleration data. As shown in FIG. 3, the reference acceleration data is a theoretical acceleration of the acceleration sensor, that is, theoretically a sum of the real acceleration of the vehicle and the gravitational acceleration sine of the gradient angle or G. sin θ represents an acceleration of the acceleration sensor 6 actually observed. In other words, as shown in FIG. 4, the acceleration sensor 6, when the vehicle to which it is attached rests on a slope, receives the sine of the gravitational acceleration (G. sin θ) with respect to the sloping angle θ in addition to a real acceleration. The reference value calculating section 29 determines the theoretical acceleration of the acceleration sensor as a reference acceleration data. This is expressed by the following equation.

$$\text{Theoretical acceleration of acceleration sensor}=\text{real acceleration}+G\times\sin\theta \quad (2)$$

As seen above, the reference value calculating section 29 obtains a sum of a real acceleration determined by the real acceleration calculating section 25 and a gravitational acceleration sine of a gradient angle determined by the gravitational acceleration sine of the gravitational acceleration sine of gradient angle calculating section 28.

The correcting section 30 corrects an offset value based on a theoretical acceleration of the acceleration sensor included in a reference acceleration data provided by the reference value calculating section 29. Briefly, the acceleration data calculating section 21 determines an acceleration of the acceleration sensor based on the equation (1). Thus, acquisition of a corrected offset value is achieved by using a theoretical acceleration of the acceleration sensor determined by the reference value calculating section 29 based on the equation (2), that is, by dividing the theoretical acceleration obtained based on reference acceleration data with the sensitivity of the acceleration sensor 6, and by subtracting the result from a sensor output. This is expressed by the following equation:

$$\text{Corrected offset value}=\text{sensor output}-(\text{real acceleration}+G.\ \sin\theta)/\text{sensitivity} \quad (3)$$

The correcting section 30, on detection of a driving condition where a real acceleration determined by the real acceleration calculating section is nearly zero, and a gradient angle determined by the gradient angle calculating section is nearly zero degree, takes up output from the acceleration sensor, and adopts it as an approximately right offset value. Referring to the equation (3), if a real acceleration is nearly zero and a gradient angle is nearly zero degree, (real acceleration+G×sin θ) will be zero, and thus offset value is almost the same as sensor output. In this driving condition it is not necessary to obtain the sensitivity of the acceleration sensor 6.

As described above, the correcting section 30 determines, by calculation, offset values as appropriate in accordance with current driving conditions, and averages the offset values to provide an averaged offset value which is stored in the internal memory.

Navigation guide section 23 guides the vehicle by providing it with information regarding the moving state of the vehicle in accordance with the current driving performance of the vehicle. The navigation guide section 23 includes current position determining section 31, target point detecting section 32 and path determining section 33, and guide information notifying section 34.

Current position determining section 31 generates some candidate positions as to the current position of the vehicle based on the velocity and azimuth data provided by the velocity and azimuth sensors 4 and 5; determines the coordinates of the current position of the vehicle in a miniature coordinate system based on the GPS data delivered by the GPS mediated information receiving portion 2; compares the calculated candidate positions with the GPS mediated coordinate data to determine a right current position of the vehicle and plots the position on a map presented on the display portion 9.

In addition, when the vehicle runs an uphill to reach a plateau, the current position determining section 31 finds by calculation the gradient of the uphill and height of the plateau based on the acceleration data provided by the acceleration data calculating section which generates said data based on acceleration data provided by the acceleration sensor 6, and plots the current position on a miniature coordinate system, and determines the current position. Thus, even if the vehicle runs on a curved ramp intersection of a highway where any point on the road has a number of vertical overlaps when viewed flatly, the section in question can accurately determine the current position of the vehicle. Moreover, even when the vehicle runs on a mountain trail or upward slope, the section in question detects the difference between the travel distance calculated based on the data from the velocity and azimuth sensors, and distance actually traveled by the vehicle, and corrects the calculated distance by making allowance, for example, for the gradient of the slope, and determines a right current position of the vehicle.

The current position determining section 31 further determines, by calculation, driving information such as the velocity of the vehicle, the direction, and the distance the vehicle has traveled based on velocity, heading and acceleration data. In addition to the current positions described above, the current position determining section 31 may determine or choose, as a phantom current position, a start position which was initially fed via the operation portion 8 instead of the actual current position of the vehicle. Various data obtained by the current position determining section 31 are delivered to the internal memory within the system control portion 11 to be stored there.

Target point detecting section 32 obtains, for example, information about the target point fed via the operation portion 18, and locates the target point. The information about the target point may include any knowledge about the point such as the coordinates of the target point, e.g., its latitude and longitude, the address and phone number of a resident living on the spot, etc. The information obtained by the target point detecting section 32 will be stored in the internal memory.

The path determining section 33 determines an appropriate path from a current position of the vehicle determined by the current position determining section 31, or from a phantom current position such as a start position as instructed via the operation portion 8 by the user to a target point based on the data acquired by the target point detecting section 32. Specifically, the section in question chooses some candidate paths connecting the current position with the target point based on the map information and additional information fetched from the map information storing portion 7, and determines an appropriate one depending on search condition fed in advance, e.g., a path requiring a shortest travel time, a shortest path, or a path along which traffic congestion or regulation is least expected. The chosen path is stored in the internal memory and is presented as appropriate on the display portion 9 in response to an instruction fed via the operation portion 8.

The navigation guide section 34 provides the user with guide information helpful for the smooth approach of the vehicle to the target point fed previously and stored in the internal memory, by causing the display portion 9 to visually present the information and the verbal guide portion 10 to audibly present the information. For example, the navigation guide section 34 causes the display portion 9 to display a symbol such as an arrow as appropriate on the screen, or the verbal guide section 10 to deliver a speech, e.g., "Turn right at an XX intersection 700 m ahead towards YY," "You have missed the path," or "Traffic congestion ahead."

[Operation of the Navigation Guide System]

Next, operation of the navigation guide system 1 will be described.

Firstly, the user driving a vehicle turns on the power switch of a navigation guide device 1 to supply the device with power. Being supplied with power, the system control portion 11 instructs the acceleration data correcting section 22 to try to get a corrected offset value. Specifically, in response to the instruction, the real acceleration acquiring section 25 determines by calculation a real acceleration; the velocity information acquiring section 26 determines by calculation horizontal and vertical velocity components based on information carried by radio waves received by the GPS mediated information receiving portion 2; and the gradient angle calculating section 27 determines by calculation a gradient angle.

At the instant when the device is supplied with power, the vehicle to which the device is attached still stays motionless, thus the real acceleration is zero. When the vehicle is parked on a horizontal plane, the gradient angle θ is zero degree.

As long as the vehicle stays motionless, the gravitational acceleration sine of the gravitational acceleration sine of gradient angle calculating section 28 can not provide a gradient angle because a frequency change of radio waves from GPS as a result of Doppler effect can not be expected. To check whether the vehicle parks on a horizontal plane or not in such a situation, the device may urge the user to take some appropriate operation, or fetch a gradient angle θ lastly provided by the gravitational acceleration sine of gradient angle calculating section stored in the internal memory, and use it as a substitute.

If the device 1 finds the vehicle parks on a horizontal plane, the correcting section 30 takes output from the acceleration sensor 6 as an offset value, and this offset value is stored in the internal memory. If an offset value lastly recorded exists in the memory, an average of the two values is calculated to be used as a new offset value. The correction section corrects the new offset value which is then stored in the memory.

If the device 1 finds the plane on which the vehicle parks is not horizontal, it reads a gradient angle θ lastly recorded in the memory, and determines by calculation the gravitational acceleration sine of the gradient angle (G. sin θ). Then, it reads the sensitivity of the acceleration sensor 6 stored in the internal memory, and determines an offset value by introducing the sensitivity value in the equation (3). The new offset value is corrected and then stored in the internal memory.

The user feeds input necessary for navigation guide via the operation portion 8. In the input feeding, the user feeds a target point via the operation portion 8. Then, the user feeds search condition such as the shortest time, shortest distance or least traffic congestion or regulation, i.e., condition that must be satisfied when a path is determined for the target point. The path determining section 33 seeks a path that will satisfy the condition fed by the user as much as possible.

The current position detecting section 31 recognizes the current position of the vehicle based on GPS data, velocity data, heading data, and acceleration data. The acceleration data is provided by the acceleration data calculating section 21 which obtains the data in question using output from the acceleration sensor 6 and the offset value and sensitivity of the acceleration sensor 6 stored in the internal memory.

The target point detecting section 32 recognizes the target point based on the target point information provided by the user via the operation portion 8. The path determining section 33 determines an appropriate path from the current position provided by the current position detecting section 31 to the target point provided by the target point detecting section 32, based on map information and additional information. The system control portion 11 causes the path thus determined to be stored in the internal memory, and instructs the display portion 9 to display the path thus determined together with the map information.

Then, the user drives the vehicle such that the current position of the vehicle coincides with the path on the screen of the display portion 9. The driving state of the vehicle is recognized by the system control portion 11 based on the data provided by the GPS mediated information receiving section 2 and data provided by the sensors 4, 5 and 6.

The system control portion 11 causes the offset value to be corrected as appropriate during the driving of the vehicle. Correction of the offset value consists of determining an offset value using the equation (3), combining it with an offset value lastly recorded in the internal memory to obtain an average, correcting the average, and storing the corrected value as a new offset value. Thus, even during driving, the acceleration of the acceleration sensor 6 is determined based on the output from the acceleration sensor 6, while the offset value of the acceleration is repeatedly corrected and updated. Therefore, even if the offset value varies as a result of temperature change or the long run of the vehicle, the change is canceled by repeated correction, and thus a right output from the sensor is insured.

[Advantages Obtained from Navigation Guide Device]

As described above, according to the navigation guide device 1 of this invention, because the acceleration data correcting section 22 corrects the offset value which is used for the calculation of the acceleration of the acceleration sensor even during the driving of the vehicle, acceleration data based on the output from the acceleration sensor 6 is properly corrected. Therefore, the navigation guide section 23 can properly guide the navigation of the vehicle. With the conventional navigation guide system, it is necessary to park the vehicle on a horizontal plane before a right offset value is obtained, which may require a complicated operation depending on given situations. However, with the navigation guide device of this invention, the offset value is automatically corrected during the driving of the vehicle; right acceleration data is easily obtained; and thus proper navigation guide is insured.

Determination of a right offset value is simply achieved: it consists of determining a theoretical acceleration of the acceleration sensor, dividing the theoretical acceleration with the sensitivity of the acceleration sensor 6, and subtracting the result from the sensor output. Thus, the navigation guide device of this invention does not require the installment of a special sensor for this purpose such as a gradient angle sensor, but can easily correct the offset value to obtain a rightly corrected acceleration data only depending on radio navigation waves conventionally used.

According to the navigation guide device of this invention, updating of the offset value consists of determining an offset value, combining the offset value with an offset value lastly recorded in memory to obtain their average, using the average as a new offset value, and repeating the process. Therefore, even if the offset value alters as a result of temperature changes and the use condition of the vehicle, acquisition of right acceleration data is insured.

When driving consists of driving the mobile body at a constant velocity on a horizontal plane with a real acceleration and gradient angle being kept nearly zero and zero angle, respectively, e.g., when the vehicle runs on a highway at a constant speed, the navigation guide device 1 takes output from the acceleration sensor as an approximately right offset value, and ignores the contribution of the sensitivity of the acceleration sensor to the offset value. This simplifies operation required for the acquisition of a right offset value which will lead to the improved use efficiency. As described above, when the real acceleration and gradient angle θ are zero and zero degree, respectively, the correction section 30 assumes output from the acceleration sensor represents approximately a right offset value, and determines a corrected offset value based on the assumption. Then, involvement of the sensitivity of the acceleration sensor 6 in the determination of a right offset value is eliminated, and thus it is possible to readily and securely obtain a right offset value.

[Variants of the Embodiment]

The present invention is not limited in any way to the above embodiment, but includes various variants thereof as described below, as long as they contribute to the attainment of the object of the present invention.

According to the above embodiment, the navigation guide device 1 includes the acceleration data correcting section 22 and navigation guide section 23 in one body. However, the acceleration data correcting section 22 may be separated as a distinct unit from the main body. Then, the acceleration data correction section 22, as a separate unit, may receive output from the acceleration sensor 6 from the main body and return a corrected offset value to the main body.

According to the above embodiment, two offset values sequentially obtained are averaged to be used as a new offset value. However, a newly determined offset value may be used as it is as an updated offset value, in the place of a lastly recorded offset value.

According to the above embodiment, determination of a real acceleration is achieved by the velocity sensor 4 which counts or reads pulse signals or voltage delivered or accumulated with the rotation of a wheel or wheel axis. However, the navigation guide device may determine a real acceleration, for example, based on navigation radio waves received by the GPS mediated information receiving portion 2.

According to the above embodiment, the system control portion 11 is included in the navigation guide device 1 installed in a vehicle. However, the system control portion 11 may be made a separate unit distinct from the main body of the navigation guide device 1, and installed in a remote server. The navigation guide main body attached to a vehicle transmits a radio signal carrying data from the sensors 4, 5 and 6 and from the GPS mediated information receiving portion 11 using a communication section to the server so that the system control portion 11 there can correct acceleration data, determine the current position of the vehicle and a path, and prepare data necessary for navigation guidance, and that the server can transmit those data back to the terminal navigation guide unit which then guides the navigation of the vehicle by presenting the data with the display portion 9 or verbal guide section 10. In such a system, the terminal navigation guide unit can be small and light. In addition, if the map information storing portion 7 is attached to the system control portion 11 in the server, so that the terminal navigation guide unit can obtain necessary map information from the server via wireless communication, the terminal navigation guide unit can be very small and light, because said unit is relieved of the burden of storing map information which often requires a huge capacity memory.

Map information may be arranged in any known form including one where roads are assumed to be a network consisting of links (with different IDs) connecting nodes. For example, map information may be arranged as follows: for a network of roads, each cross-point is plotted in a coordinate system, and the directions of the roads departing from the cross-point are similarly registered.

The specific configurations of the device of this invention, and specific procedures for achieving the method of this invention may be substituted for widely different variants in the attainment of the same object of this invention.

What is claimed is:

1. A correction device for correcting acceleration data, correction being achieved by determining, via calculation, an offset value of an acceleration sensor which detects the acceleration of a mobile body and delivers the detection result as output, and by correcting acceleration data determined based on output from the acceleration sensor using the offset value, comprising:

real acceleration calculating section for determining, by calculation, a real acceleration of the mobile body based on a signal changing in association with the moving velocity of the mobile body;

velocity data acquiring section for acquiring horizontal and vertical velocity components by receiving radio waves from plural artificial satellites, and using a frequency change of received radio waves evoked as a result of Doppler effect;

gradient angle calculating section for calculating a gradient angle between a horizontal plane passing through the mobile body and a plane towards which the mobile body is moving, based on the horizontal and vertical velocity components acquired by the velocity data acquiring section;

gravitational acceleration sine of gradient angle calculating section for determining, by calculation, a gravitational acceleration sine of the gradient angle determined by the gradient angle calculating section;

reference value calculating section for determining, by calculation, reference acceleration data based on the real acceleration provided by the real acceleration calculating section and on the gravitational acceleration sine of the gradient angle provided by the gravitational acceleration sine of the gradient angle calculating section; and correcting section for correcting the offset based on the reference acceleration data provided by the reference value calculating section.

2. A correction device for correcting acceleration data according to claim 1 wherein:

the correcting section divides plural reference acceleration data obtained during the driving of the mobile body with the sensitivity of the acceleration sensor, and subtracts the result from output from the sensor, so that the plural offset values are averaged.

3. A correction device for correcting acceleration data according to claim 1 wherein:

the correcting section, on detection of a driving condition where the real acceleration determined by the real acceleration calculating section is nearly zero, and the gradient angle determined by the gradient angle calculating section is nearly zero degree, takes up output from the acceleration sensor, and adopts it as an approximately right offset value.

4. A navigation guide system comprising:

a correction device for correcting acceleration data according to claim 1; and a navigation guide device which acquires acceleration data corrected by the correction device, and guides the navigation of a mobile vehicle by providing the mobile body with information regarding the moving state of the mobile body in accordance with the current driving performance of the mobile body together with map information.

5. A correction method for correcting acceleration data, correction being achieved by causing a computation section to correct an offset value of an acceleration sensor which detects the change of velocity of a mobile body and delivers it as output, comprises the steps of:

detecting a signal changing in accordance with the moving velocity of the mobile body;

determining, by calculation, a real acceleration of the mobile body based on the detected signal;

acquiring horizontal and vertical velocity components by receiving radio waves from plural artificial satellites, and using a frequency change of received radio waves evoked as a result of Doppler effect;

determining, by calculation, a gradient angle between a horizontal plane passing through the mobile body and a plane towards which the mobile body is moving, based on the horizontal and vertical velocity components;

determining, by calculation, the gravitational acceleration sine of the gradient angle;

determining, by calculation, a reference velocity data by adding the real acceleration of the mobile body and the gravitational acceleration sine of the gradient angle; and correcting the acceleration data by correcting the offset value based on the reference acceleration data.

6. A correction program embodied in a computer-readable medium for use in a navigation guide method for correcting of acceleration data when executed by a computation section will cause said computation section to correct an offset value of an acceleration sensor which detects the change of velocity of a mobile body and delivers it as output, the method comprising the steps of:

detecting a signal changing in accordance with the moving velocity of the mobile body, determining, by calculation, a real acceleration of the mobile body based on the detected signal, acquiring horizontal and vertical velocity components by receiving radio waves from plural artificial satellites, and using a frequency change of received radio waves evoked as a result of Doppler effect, determining, by calculation, a gradient angle between a horizontal plane passing through the mobile body and a plane towards which the mobile body is moving, based on the horizontal and vertical velocity components, determining, by calculation, the gravitational acceleration sine of the gradient angle, determining, by calculation, a reference velocity data by adding the real acceleration of the mobile body and the gravitational acceleration sine of the gradient angle, and correcting the acceleration data by correcting the offset value based on the reference acceleration data.

7. A recording medium, comprising an acceleration data correction program embodied in a computer-readable medium, wherein the acceleration data correction program is for navigation guidance and for correcting acceleration data when executed by a computation section will cause said computation section to correct an offset value of an acceleration sensor which detects the change of velocity of a mobile body and delivers it as output, wherein the program detects a signal changing in accordance with a moving velocity of the mobile body, determines, by calculation, a real acceleration of the mobile body based on the detected signal, acquires horizontal and vertical velocity components by receiving radio waves from plural artificial satellites, and uses a frequency change of received radio waves evoked as a result of Doppler effect, determines, by calculation, a gradient angle between a horizontal plane passing through the mobile body and a plane towards which the mobile body is moving, based on the horizontal and vertical velocity components, determines, by calculation, the gravitational acceleration sine of the gradient angle, determines, by calculation, a reference velocity data by adding the real acceleration of the mobile body and the gravitational acceleration sine of the gradient angle, and corrects the acceleration data by correcting the offset value based on the reference acceleration data.

* * * * *